United States Patent

Qu et al.

(10) Patent No.: US 8,503,557 B2
(45) Date of Patent: *Aug. 6, 2013

(54) APPARATUS, AND ASSOCIATED METHOD, FOR COMMUNICATING A DATA BLOCK IN A MULTI CARRIER MODULATION COMMUNICATION SCHEME

(75) Inventors: Shouxing Qu, Ottawa (CA); Farzaneh Kohandani, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,308

(22) Filed: Jun. 18, 2012

(65) Prior Publication Data

US 2012/0257663 A1    Oct. 11, 2012

Related U.S. Application Data

(63) Continuation of application No. 13/082,116, filed on Apr. 7, 2011, now Pat. No. 8,223,866, which is a continuation of application No. 11/670,787, filed on Feb. 2, 2007, now Pat. No. 7,944,980.

(51) Int. Cl.
   *H04K 1/10*   (2006.01)
(52) U.S. Cl.
   USPC ........... 375/260; 375/130; 375/135; 375/267; 375/296; 375/222
(58) Field of Classification Search
   USPC ............... 375/260, 262, 265, 267, 130, 135, 375/222, 295, 296; 370/203, 204, 205, 207, 370/208, 209, 210
   See application file for complete search history.

(56) References Cited

U.S. PATENT DOCUMENTS

| | | |
|---|---|---|
| 7,103,097 B1 | 9/2006 | Duvaut et al. |
| 7,269,782 B2 | 9/2007 | Kim et al. |
| 7,318,185 B2 | 1/2008 | Khandani et al. |

(Continued)

FOREIGN PATENT DOCUMENTS

| | | |
|---|---|---|
| EP | 0942566 A2 | 9/1999 |
| EP | 1278347 A2 | 1/2003 |
| WO | 00/72543 A1 | 11/2000 |

OTHER PUBLICATIONS

Seung Hee Han and Jae Hong Lee, "An Overview of Peak-to-Average Power Ratio Reduction Techniques for Multicarrier Transmission", IEEE Wireless Communication, Apr. 2005, pp. 56-65.

(Continued)

*Primary Examiner* — Dhaval Patel

(57) ABSTRACT

Apparatus, and an associated method, for sending a data block in an OFDM, or other MCM, communication system with reduced PAPR is provided. The data block is combined with a random scrambling sequence. An IDFT operation is performed upon the combined sequence, and its PAPR, peak-to-average power ratio, is calculated. The PAPR is compared against a threshold. If the PAPR is smaller than a threshold, the transformed, combination sequence is transmitted. Otherwise, a different scrambling sequence, if available, is used to form a new combination sequence, and the process iterates until either a PAPR smaller than the threshold is obtained, or a pre-defined maximum number of iterations is reached. If the maximum number of iterations is reached and no combination sequence is created that leads to an acceptable PAPR, then the transformed, combination sequence that exhibits the smallest PAPR level is selected for transmission.

20 Claims, 3 Drawing Sheets

U.S. PATENT DOCUMENTS

| | | | |
|---|---|---|---|
| 7,376,202 | B2 | 5/2008 | Bar-Ness et al. |
| 7,539,172 | B2 * | 5/2009 | Garcia et al. ............... 370/344 |
| 7,660,360 | B2 | 2/2010 | Yue et al. |
| 7,944,980 | B2 | 5/2011 | Qu et al. |
| 2004/0093545 | A1 | 5/2004 | Khandani et al. |
| 2005/0089116 | A1 * | 4/2005 | Moffatt et al. ............... 375/295 |
| 2006/0104373 | A1 | 5/2006 | Bar-Ness et al. |
| 2007/0223365 | A1 | 9/2007 | Tsfaty et al. |
| 2008/0159537 | A1 | 7/2008 | Khan et al. |

OTHER PUBLICATIONS

C. Tellambura, "Computation of the Continuous-Time PAR of an OFDM Signal with BPSK Subcarriers", IEEE Communications Letter, vol. 5, No. 5, May 2001, pp. 185-187.

R. van Nee and A. de Wild, "Reducing the Peak-to-Average Power Ratio of OFDM", Proc. IEEE Vehicular Technology Conference (VTC'98), May 1998, pp. 2072-2076.

Denis J.G. Mestdagh and Paul M.P. Spruyt, "A Method to Reduce the Probability of Clipping in DMT-Based Transceivers", IEEE Transactions on Communications, vol. 44, No. 10, Oct. 1996, pp. 1234-1238.

Lin, et al., "Selective-Mapping Type Peak Power Reduction Techniques for Turbo Coded OFDM", 2005 International Conference in Wireless Networks, Communications and Mobile Computing, Jun. 13-16, 2005, vol. 1, pp. 119-122, ISBN: 0-7803-9305-8.

I.M. Hussain and I.A. Tasadduq, "Novel SLM Based Techniques for PAPR Reduction of OFDM", 2006 IEEE Region 10 Conference TENCON 2006, Hong Kong, No. 2006, pp. 1-4, ISBN: 1-4244-0549-1.

Kyeongcheol Yang, "Peak-to-Average Power Control in OFDM Using Standard Arrays of Linear Block Codes", IEEE Communications Letter, Apr. 2003, vol. 7, No. 4, pp. 174-176, ISSN: 1089-7798.

Mizhou Tan and Yeheskel Bar-Ness, "OFDM Peak-to-Average Power Ratio Reduction by Combined Symbol Rotation and Inversion with Limited Complexity", IEEE Global Telecommunications Conference, 2003, GLOBECOM '03, Dec. 1-5, 2003, vol. 2, pp. 605-610, ISBN: 0-7803-7974-8.

S.H. Muller and J.B. Huber, "A Comparison of Peak Power Reduction Schemes for OFDM", Global Telecommunications Conference, GLOBECOM '97, Phoenix, AZ, USA, Nov. 3-8, 1997, pp. 1-5, XP010254553.

Aylin Susar, "OFDM PAPR Reduction with Linear Coding and Codeword Modification", [Online] Aug. 1, 2005, pp. 1-116, XP002615697.

* cited by examiner

APPARATUS, AND ASSOCIATED METHOD, FOR COMMUNICATING A DATA BLOCK IN A MULTI CARRIER MODULATION COMMUNICATION SCHEME

CROSS-REFERENCE OF RELATED APPLICATION

The present application is a continuation of U.S. patent application Ser. No. 13/082,116 filed on Apr. 7, 2011, which is a continuation of U.S. patent application Ser. No. 11/670,787, filed on Feb. 2, 2007, now U.S. Pat. No. 7,944,980, issued on May 17, 2011. The contents of these applications are incorporated herein by reference in their entireties.

The present invention relates generally to a manner by which to communicate a data block in an OFDM-based or other MCM-based communication system. More particularly, the present invention relates to apparatus, and an associated method, by which to combine the data block with a randomized, scrambling sequence to form a combination sequence that leads to a PAPR (Peak-to-Average Power Ratio) of selected characteristics.

The data block is combined with successive scrambling sequences until a combination sequence is formed that leads to the PAPR of selected characteristics. And, the combination sequence that leads to these selected characteristics is transmitted. If none of the combination sequences leads to a PAPR of the selected characteristics, then the combination sequence that leads to the smallest PAPR is transmitted. Through random or appropriate selection of the combination sequence, the informational content of the data block is communicated while avoiding problems that sometimes result when transmitting data blocks that lead to high PAPRs.

BACKGROUND OF THE INVENTION

The use of radio communication systems through which to communicate is pervasive in modern society. Cellular communication systems, for instance, are deployed throughout significant portions of the populated areas of the world, providing users access to communicate therethrough when positioned in an area encompassed by a cellular communication system. Successive generations of cellular communication systems have been developed and deployed, each successive generation providing increased communication capabilities. For instance, while early-generation cellular communication systems were used primarily for voice communications, successor-generation cellular communication systems provide increased data communication capabilities. New-generation systems are capable of providing multimedia communication services at guaranteed levels of quality.

In a cellular communication system, and more generally, any radio, as well as another, communication system, channel bandwidth allocation is limited. The frequency spectrum allocated for use by a cellular communication system is limited, and such limitation is regularly a limiting factor in the communication capacity of the system. Effort is made, therefore, to utilize the allocated capacity in an efficient manner.

OFDM (Orthogonal Frequency Division Multiplexing) schemes, and other MCM (Multi-Carrier Modulation) schemes, e.g., provide the possibility of more efficient usage of channel bandwidth, thereby permitting increased speed for data to be communicated within a given channel bandwidth. In an OFDM communication scheme, sub-carriers are defined that are orthogonal. In an OFDM scheme, power management is an important function. Power efficiency, e.g., is dependent upon power characteristics of communications upon OFDM-defined channels. One power characteristic of interest is a PAPR, Peak-To-Average Power Ratio. It is generally desired to communicate data at a relatively low PAPR. When the data leads to a higher PAPR, the power amplifier (PA) at a transmit station has to operate at a lower level of average power. When operated at the lower average power level, the resultant signal is of lower transmit power, and the coverage area of service is reduced. And, when operated at the lower average power level, the PA operates with a lower power efficiency, resulting in a higher service cost, and reduced battery longevity if the transmit station is powered by a battery power supply.

If a manner could be provided by which better to ensure that data that is to be communicated in an OFDM, or other MCM, communication system leads to an acceptably low PAPR level, communication improvements would be likely.

It is in light of this background information related to communications in an OFDM or MCM communication scheme that significant improvements of the present invention have evolved.

DETAILED DESCRIPTION

Figure 1:
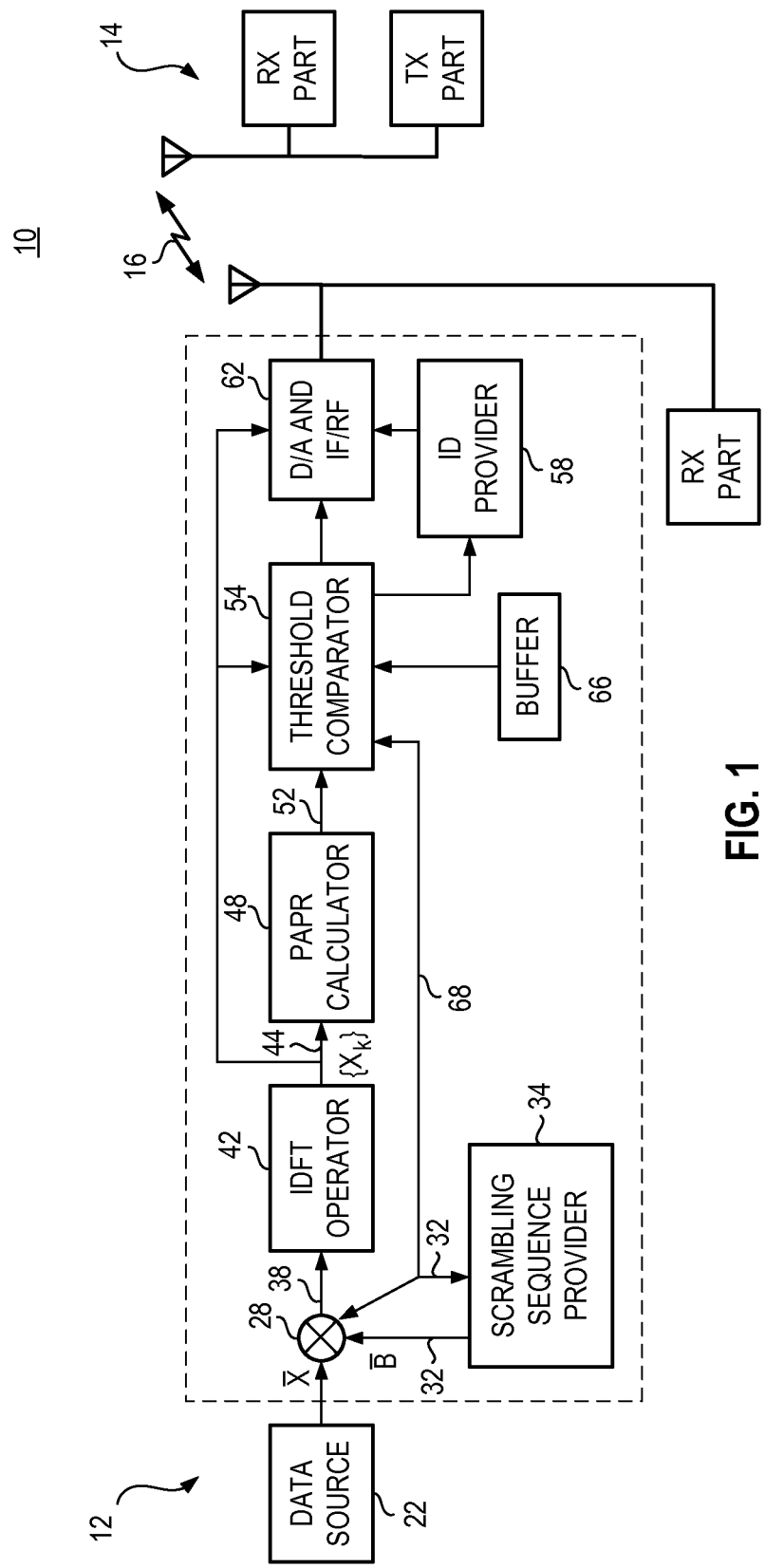
FIG. 1 illustrates a functional block diagram of a radio communication system in which an embodiment of the present invention is operable.

The present invention, accordingly, advantageously provides apparatus, and an associated method, for communicating a data block in an OFDM-based, or other MCM-based, communication system.

Through operation of an embodiment of the present invention, a manner is provided by which to combine the data block with a randomized, scrambling sequence to form a combination sequence that leads to a PAPR (Peak-to-Average Power Ratio) of selected characteristics.

In one aspect of the present invention, the data block is combined with successive scrambling sequences until a combination sequence is formed that leads to the PAPR of the selected characteristics. Once the combination sequence that leads to the PAPR of the selected characteristics is formed, the combination sequence is transmitted.

In another aspect of the present invention, if none of the combination sequences leads to a PAPR of the selected characteristics, then a combination sequence that leads to the smallest PAPR is selected for transmission.

Through selection of the combination sequence that leads to a PAPR of selected characteristics, or a smallest-available PAPR level, the informational content of the data block is communicated while reducing the likelihood of occurrence of problems that sometimes result when data blocks leading to high PAPRs are transmitted.

In another aspect of the present invention, a product sequence is formed of a data block that is to be communicated multiplied with a binary sequence. Once formed, an inverse discrete Fourier transform (IDFT) is performed upon the product sequence and the PAPR after IDFT is calculated. If the calculated PAPR is smaller than a pre-defined threshold, then the product sequence is caused for transmission.

If, conversely, the calculated PAPR of the product sequence after IDFT is not smaller than the threshold level, then the PAPR level and the transformed product sequence are buffered, and a new product sequence is formed, formed of another scrambling sequence multiplied with the data block. An iterative procedure of performing an IDFT on the newly created product sequence, calculation of the PAPR, and comparison with the threshold value is performed. The iterative procedure continues until a PAPR associated with a product sequence is smaller than the threshold or unique scrambling sequences no longer remain available to form new product sequences.

If, upon completion of the successive iterations, no product sequence leads to a PAPR that is smaller than the threshold, then the buffered sequence after IDFT that leads to the smallest PAPR, albeit larger than the threshold, is selected for transmission.

In another aspect of the present invention, a scrambling sequence that is combined with a data block in each iteration is selected from a set of scrambling sequences. Each scrambling sequence is independent from other sequences. And, each scrambling sequence is of the length corresponding to the length of the data block. The values of the binary, scrambling sequence are of randomly-generated "1" or minus "1" values. The scrambling sequences are, e.g., randomly generated off-line and in advance, then saved at both the transmitting and receiving stations. The receiving station thereby knows the entire set of sequences in advance.

In another aspect of the present invention, a buffer is provided to buffer values of sequences out of IDFT together with their associated, calculated PAPRs. In each iteration, if the sequence after IDFT exhibits a PAPR that is larger than the threshold, the sequence after IDFT and its associated PAPR are buffered. In the event that all candidate scrambling sequences have been iterated and no sequence after IDFT is of a PAPR that is smaller than the threshold, then a determination is made of which of the buffered sequences exhibits the smallest PAPR. The buffered sequence that exhibits the smallest PAPR is selected for transmission and is retrieved from the buffer and caused to be communicated.

In the event that a first product sequence after IDFT exhibits a PAPR smaller than the threshold, only a single product sequence is formed. And, iterations of product-sequence formations, IDFT operations, PAPR calculations, and comparison operations are performed successively until a PAPR of a product sequence after IDFT is determined to be smaller than the threshold. That is to say, product sequences are only formed to the extent needed. Determination is made responsive to formation of each successive product sequence as to whether the product sequence after IDFT exhibits a PAPR smaller than the threshold. Extra product sequences, i.e., product sequences that might not be needed are not formed. Through the transmission of transformed product sequences after IDFT that exhibit acceptable, or smaller-available, PAPRs, improved communication performance is obtained.

In these and other aspects, therefore, apparatus, and an associated method, are provided for forming a transmit block formed of a data block. The transmit block is for communication pursuant to an OFDM scheme. A combiner is configured to combine the data block with a selected, scrambling sequence to form a combination sequence. The transmitter is configured to transmit the transformed combination sequence after IDFT when a PAPR associated with the combination sequence after IDFT is of a selected level.

Referring first, therefore to FIG. 1, portions of a radio communication system, shown generally at 10, include a set of communication stations 12 and 14, interconnected by way of a radio air interface, here represented by the segment 16. In the exemplary implementation, the communication system 10 forms an OFDM (Orthogonal Frequency Division Multiplexing)-based communication system, or other MCM (Multi-Carrier Modulation)-based communication system. OFDM-based communication schemes are proposed for a so-called fourth generation (4G) cellular communication system. The following description shall describe exemplary operation with respect to implementation of the communication system as a 4G, OFDM-based cellular communication system. It should be understood, however, that the following description is analogously also representative of many other communication systems, both wireless and wireline, in which data blocks are communicated. Additionally, description of operation shall be described with respect to the communication station 12 forming a network station, and the communication station 14 forming a mobile station or vice versa. In the exemplary implementation, both the communication stations include analogous functionality and are operable in analogous manners.

A data source 22 sources data. Each data is a value taken from an M-ary signal constellation. And, each data block is formed of N such values in general. A data block sourced at the data source is provided, here indicated by way of the line 24, to a multiplier 28 that forms a combiner. The multiplier multiplies symbol values together with a scrambling sequence provided to the multiplier on the line 32. The scrambling sequence is provided on the line 32 by a scrambling sequence provider 34. The scrambling sequence provider forms a sequence generator or a cache of scrambling sequences, available for retrieval and use for combination with the data block at the multiplier 28. Each scrambling sequence is a sequence of binary values with different binary sequences forming independent sequences, each consisting of N numbers of randomly generated 1 and −1 values. The multiplier combines the data block and the scrambling sequence to form a product sequence, viz., a combination sequence. The sequence is provided, here indicated by way of the line 38, to an IDFT (Inverse Discrete Fourier Transform) operator 42. The IDFT operator performs an IDFT operation upon the combination sequence on the line 38 and generates a transformed block of values on the line 44.

The transformed block of values is provided to a PAPR (Peak to Average Power Ratio) calculator 48. The PAPR calculator calculates a value of the PAPR for the transformed block of values thereto. And, the calculated PAPR value, formed on the line 52, is provided to a threshold comparator 54. The threshold comparator compares the value of the PAPR calculated by the calculator 48 with a pre-determined threshold value. If the calculated PAPR associated with the transformed block of values is smaller than the threshold, then a decision is made to send the transformed values of the product sequence associated with the acceptable PAPR value. An indication of the scrambling sequence used in the formation of the product sequence is provided to a control signal generator comprising a scrambling sequence ID provider 58.

The provider 58 generates a control signal that identifies the scrambling sequence used in the product sequence formation. The provider 58, for instance, generates control bits that populate a field of a control signal that is sent by the communication station. The transmit chain includes a D/A (Digital-to-Analog) and an IF/RF (Intermediate Frequency/Radio Frequency) element 62. The control signal generated by the control signal generator 58 is caused to be transmitted by the element 62. When a value of the PAPR calculated by the calculator is smaller than the threshold, the threshold comparator permits the associated product sequence after IDFT to be provided to the element 62 to be transmitted therefrom. In the event that the PAPR value is larger than the threshold, then the product sequence after IDFT and its associated PAPR value are buffered at a buffer 66. And, an indication is provided, here indicated by the line 68 to the scrambling sequence provider 34 and to the multiplier 28 to indicate the negative results of the comparison made by the comparator.

Responsive to the notification of the negative results, a new iteration commences. That is to say, a new scrambling sequence is provided by the scrambling sequence provider to the multiplier 28, and a new combination, i.e., product, sequence is formed. The new product sequence is transformed by the IDFT operator, its PAPR is calculated by the calculator 48, and the threshold comparator compares the calculated PAPR value against the threshold. Responsive to the comparison, the new product sequence after IDFT is of a PAPR that is acceptable, or not. If acceptable, the control signal generator operates, and the product sequence after IDFT is caused by the element 62 to be transmitted. Otherwise, the product sequence after IDFT and its associated PAPR are buffered at the buffer and additional iteration is performed, if a unique scrambling sequence remains to be provided.

If no more iterations with unique scrambling sequences can be performed, the threshold comparator accesses the buffer contents of the buffer 66 and compares the PAPR values stored therein. The buffered sequence associated with the smallest of the buffered PAPR values is selected to be sent by the communication station. Buffered information associated with the scrambling sequence used in the formation of the selected product sequence is also retrieved and provided to the control signal generator 58. The control signal generator causes a control signal to be sent by the communication station 12, to the receiving station, here the communication station 14, to alert the communication station 14 of the scrambling sequence used in the formation of the product sequence that is to be communicated thereto.

Thereby, a data block is altered, through the combination with a scrambling sequence, to alter the PAPR to facilitate its communication to the communication station 14. The operation is iterative such that unneeded operations are not performed. That is to say, if the first combination sequence, i.e., product sequence, leads to an acceptable PAPR after IDFT, additional product sequences need not be formed. And, during any iteration, if a product sequence is formed of an acceptable PAPR after IDFT, additional product sequences are not formed. And, if none of the product sequences exhibits an acceptable PAPR, selection is made of the product sequence associated with the smallest, albeit otherwise unacceptable, PAPR. And, by notifying the receiving communication system of the scrambling sequence that is used to form the product sequence, the receiving station is able, in its receive chain operation, to recover the informational content of the data block.

Figure 2:
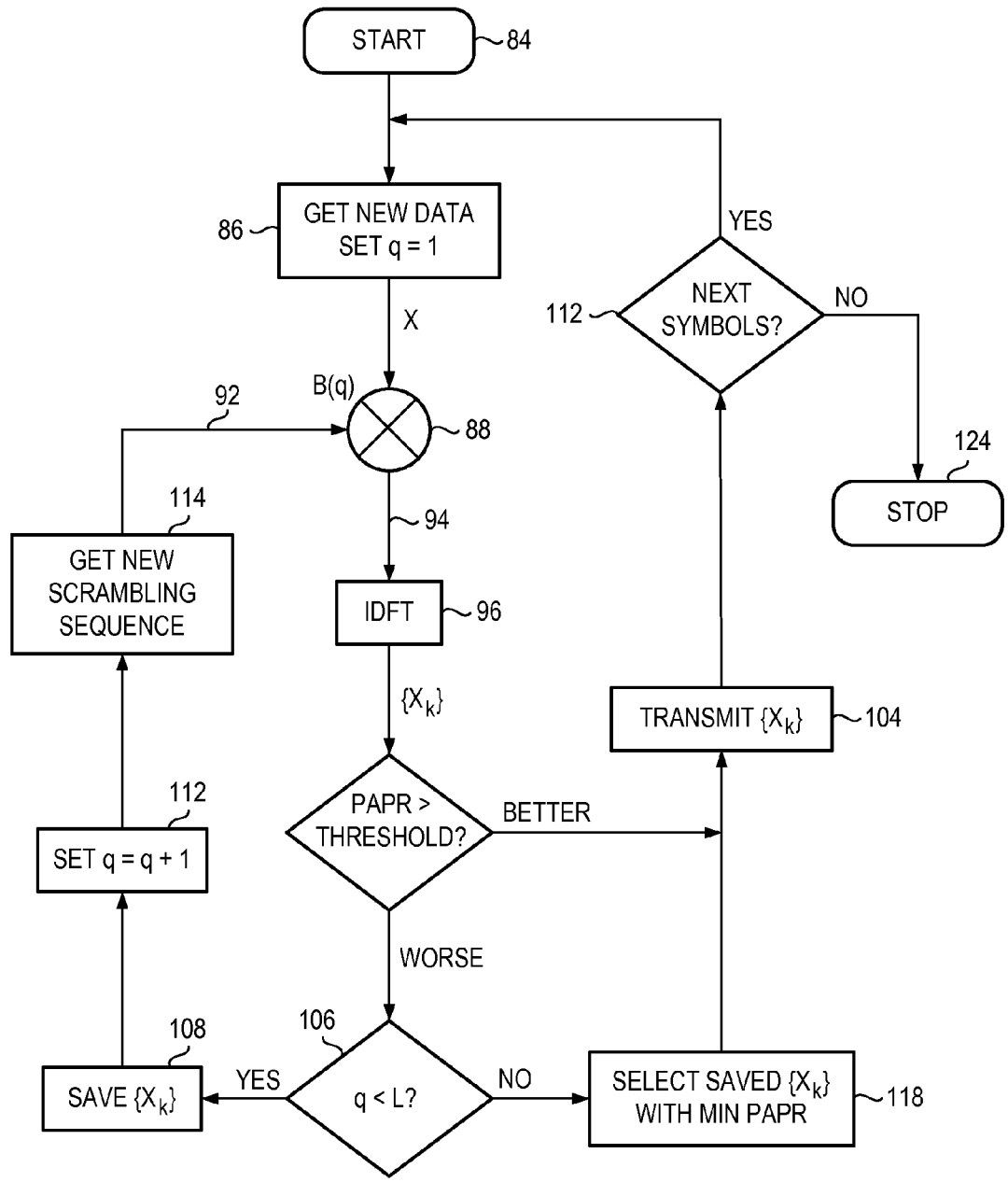
FIG. 2 illustrates a process diagram representative of the process of operation of an embodiment of the present invention.

FIG. 2 illustrates a process diagram shown generally at 82, representative of the process of operation of an embodiment of the present invention, such as that provided during operation of the apparatus 12, shown in FIG. 1. Then, and as indicated by the block 86, a new data set, X, is provided, in which q=1. Then, and as indicated by the multiplier 88, the data set is multiplied with a scrambling sequence B (q) provided by way of the path 92. A product sequence is formed and provided, by way of the line 94, to the block 96 at which an IDFT is performed upon the product sequence.

Then, and as indicated by the decision block 102, a determination is made as to whether the PAPR associated with the transform of the product sequence is smaller than a threshold. If smaller than the threshold, the "smaller" branch is taken to the block 104, and the transformed product sequence is transmitted. If, conversely, the calculated PAPR is larger than the threshold, a "larger" branch is taken to the decision block 106. A determination is made, indicated by q less than L, as to whether additional scrambling sequences are available by which to be combined with the data block. If an additional scrambling sequence is available, the "yes" branch is taken to the block 108, and transformed sequence is saved, together with its associated PAPR. Selection of a new scrambling sequence is made at the block 112, indicated by the incrementing of the small letter q variable. Then, and as indicated by the block 114, a new scrambling sequence is obtained and provided, by way of the path 92, to the multiplier 88 for a subsequent iteration of operation.

The subsequent iteration of operation is only carried out in the event that the earlier iteration fails to form a product sequence that leads to an acceptable PAPR.

If, at the decision block 106, a determination is made that no more scrambling sequences is available, the "no" branch is taken to the block 118 whereat selection of a transformed product sequence from amongst saved sequences in prior iterations of the process is made. Selection is made of the saved sequence that exhibits a best, i.e., the smallest, PAPR value.

Once selection is made, a path is taken to the block 104, and the selected, transformed sequence is transmitted.

Thereafter, a path is taken to the decision block 112, and a determination is made as to whether additional symbols are available for transmission. If so, the "yes" branch is taken back to the block 86. Otherwise, the "no" branch is taken to the stop block 124.

The collection of all data symbols $X_n$, n=0,1, ..., N−1, is denoted as a vector $X=[X_0, X_1, \ldots, X_{N-1}]^T$ that will be termed as a data block, where the superscript T stands for transposition, and $X_n$ takes a value from an M-ary signal constellation. The complex baseband representation of a multi-carrier signal consisting of N subcarriers is given by $$x(t) = \frac{1}{\sqrt{N}} \sum_{k=0}^{N-1} X_n \exp(j2\pi n f_\nabla t), \quad 0 \le t < NT \quad (1)$$

where $j=\sqrt{-1}$, $f_\nabla$, is the frequency spacing between adjacent subcarriers, and NT denotes the data block period. In OFDM the subcarriers are orthogonal (i.e., $$\left(\text{i.e., } f_\nabla = \frac{1}{NT}\right).$$

The transmitted RF signal is $$s(t)=R_e\{x(t)\exp(j2\pi f_c t)\} \quad (2)$$

where $f_c$ is the carrier frequency, and $R_e\{u(t)\}$ stands for the real part of u(t). The PAPR of the baseband signal is defined as $$PAPR = \frac{\max_{0 \le t < NT} |x(t)|^2}{1/NT \cdot \int_0^{NT} |x(t)|^2 \, dt} \quad (3)$$

An approximation in which only mN equidistant samples of x(t) are considered where m is an integer larger than or equal to 1. These "m-time oversampled" time-domain samples are represented as a vector $x=[x_0, x_1, \ldots, x_{mN-1}]^T$ and obtained as $$x_k = x(kT/m) = \frac{1}{\sqrt{N}} \sum_{n=0}^{N-1} x_n \exp(j2\pi k n f_v T/m), \quad (4)$$
$$k = 0, 1, \ldots, mN-1$$

The PAPR of the continuous-time signal cannot be obtained precisely by use of the Nyquist rate sampling, which corresponds to the case of m=1. But, setting m=4 provides sufficiently accurate PAPR results. The PAPR computed from the m-time oversampled time domain signal samples is given by $$PAPR = \max_{0 \le k \le mN-1} r_k = \max_{0 \le k \le mN-1} \frac{|x_k|^2}{E[|x_k|^2]} \quad (5)$$

where $E[\cdot]$ denotes expectation, and $r_k$ is the normalized power of $x_k$. The sequence $\{x_k\}$ in Eq. (4) is interpreted as the inverse discrete Fourier transform (IDFT) of the data block X with (m−1)N zeroes padded. As a sum of N independent random variables, in general, $x_k$ is a complex random variable. A different data block of X usually yields a different sequence of $\{x_k\}$ with a different PAPR.

As described above, binary scrambling sequences are used pursuant to an embodiment of the present invention. L binary scrambling sequences are defined, denoted as $B(q)=[[b_0(q), b_1(q), \ldots b_{N-1}(q)]^T$ with q=1, 2, ..., L, L a positive integer. For q=1, B(1) consists of all ones. For all other values of q>1, B(q)'s are independent sequences, each consisting of N numbers of randomly generated 1 or −1.

The process shown in FIG. 2 is also represented by the following five primary operations:

(1) For each given sequence of X, start with q=1.
(2) Perform IDFT on the element-by-element product of X and B(q) to get a sequence $\{x_k\}$.
(3) Find out the PAPR of the sequence $\{x_k\}$. If the PAPR is below a predefined threshold, transmit $\{x_k\}$ and claim success; otherwise save $\{x_k\}$ (denoted as $\{x_k\}$ (q)) and go to Step (4).
(4) If q<L, set q=q+1 and go back to Step (2); otherwise go to Step (5).
(5) Transmit the sequence $x_k$ associated with the minimum PAPR among the L saved sequences of $\{x_k(q)\}$.

Each time when Step (2) is performed, X is multiplied with a new binary sequence B(q) to yield a new product sequence of $\{x_k(q)\}$, and in turn yield a different PAPR after IDFT. With a limited number of trials, a PAPR below, or closer to, the threshold is obtainable with a high probability.

Figure 3:
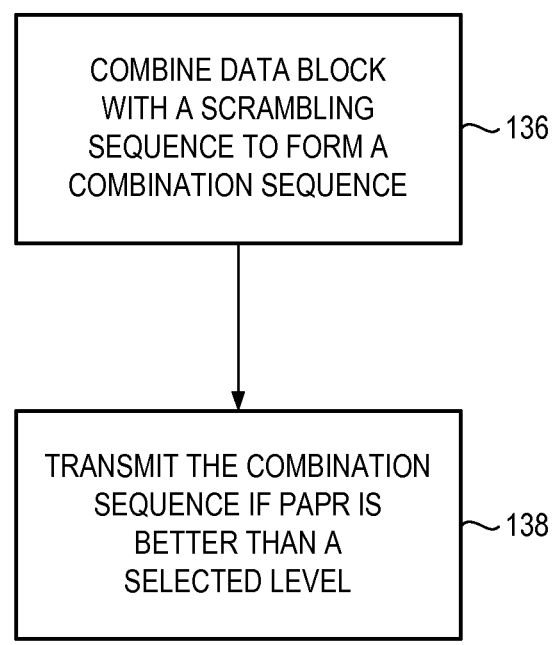
FIG. 3 illustrates a method flow diagram representative of the method of operation of an embodiment of the present invention.

FIG. 3 illustrates a method block diagram, shown generally at 132, representative of the method of operation of an embodiment of the present invention. The method facilitates formation of a transmit block formed of a data block. The transmit block is for communication pursuant to an OFDM, or other MCM, communication scheme.

First, and as indicated by the block 136, the data block is combined with a selected scrambling sequence to form a combination sequence. Then, and as indicated by the block 138, the combination sequence is selectably transmitted if a PAPR associated with the combination sequence is smaller than a selected level.

Thereby, through appropriate selection of the scrambling sequence, a data block is better able to be communicated that leads to a smaller, or acceptable, PAPR level.

What is claimed is:

1. Apparatus for determining a peak to average power ratio, PAPR, and enabling communication of data in a multi-carrier modulation, MCM, system, comprising:
   a multiplier that multiplies together a scrambling sequence of a plurality of scrambling sequences and a data block to produce a product sequence;
   a transform operator that accepts the product sequence without further modification and generates a transformed-value block therefrom;
   a PAPR calculator that accepts the transformed-value block and calculates a PAPR value; and
   a comparator that compares the PAPR value to a predetermined threshold value, wherein the transformed-value block is transmitted without further PAPR calculation when the PAPR value is smaller than the predetermined threshold value.

2. The apparatus of claim 1 wherein the transformed-value block is transmitted to a receiving station, and the receiving station uses the scrambling sequence to recover information content contained within the data block.

3. The apparatus of claim 2 wherein the control signal provider further generates control bits that populate a field of the control signal.

4. The apparatus of claim 1 further comprising a control signal provider that generates a control signal that identifies a scrambling sequence of the plurality of scrambling sequences, which identified scrambling sequence is used to generate the transformed-value block.

5. The apparatus of claim 1 further comprising a buffer and wherein the comparator is further configured to store the transformed-value block and the PAPR value in the buffer when the PAPR value is larger than the predetermined threshold value.

6. The apparatus of claim 1 wherein the comparator is further configured to provide a second scrambling sequence to the multiplier when the PAPR value is larger than the predetermined threshold value.

7. The apparatus of claim 1 wherein the MCM system further comprises an orthogonal frequency division multiplexing (ODFM) system.

8. The apparatus of claim 1 wherein the transform operator further comprises an inverse discrete Fourier transform (IDFT) operator.

9. The apparatus of claim 1 wherein the plurality of scrambling sequences each further comprise a binary number.

10. The apparatus of claim 1 wherein the plurality of scrambling sequences each further comprise a scrambling sequence of N bits and wherein the data block further comprises N bits.

11. A multi-carrier modulation, MCM, system for communicating data between at least two wireless communication stations with minimum peak to average power ratio, PAPR, comprising:
   a multiplier that multiplies together a scrambling sequence of a plurality of scrambling sequences and a data block containing informational content to produce a product sequence;
   a transform operator that accepts the product sequence without further modification and generates a transformed-value block;
   a PAPR calculator that accepts the transformed-value block and calculates a PAPR value;

a comparator that compares the PAPR value to a predetermined threshold value and permits the transformed-value block to be prepared for transmission without further PAPR calculation when the PAPR value is smaller than the predetermined threshold value;

a transmitter that wirelessly transmits the transformed-value block; and a remote receiver configured to receive the wireless transmission transmitted by the transmitter and recover informational content of the data block.

12. The system of claim 11 further comprising a control signal provider that generates a control signal that identifies a scrambling sequence of the plurality of scrambling sequences, which identified scrambling sequence is used to generate the transformed-value block that is prepared for transmission.

13. The system of claim 12 wherein the remote receiver is further configured to accept notification of which scrambling sequence of the plurality of scrambling sequences is used to generate the transformed-value block that is prepared for transmission.

14. The system of claim 11 further comprising a buffer and wherein the comparator is further configured to store the transformed-value block and the PAPR value in the buffer when the PAPR value is larger than the predetermined threshold value.

15. The system of claim 11 further comprising a sequence provider that provides the scrambling sequence to the multiplier from a cache.

16. The system of claim 15 wherein the comparator is further configured to provide an indication to the sequence provider when the PAPR value is larger than the predetermined threshold value to provide a second scrambling sequence to the multiplier from the cache.

17. The system of claim 11 wherein the MCM system further comprises an orthogonal frequency division multiplexing (ODFM) system.

18. The system of claim 11 wherein the transform operator further comprises an inverse discrete Fourier transform (IDFT) operator.

19. A method of for determining a peak to average power ratio, PAPR, and enabling communication of data in a multi-carrier modulation, MCM, system that includes at least a transmitting communication station and a receiving communication station, comprising the operations of:

multiplying together a scrambling sequence of a plurality of scrambling sequences and a data block at the transmitting communication station to produce a product sequence;

transforming the product sequence to generate a transformed-value block at the transmitting communication station;

calculating a PAPR value from the transformed-value block at the transmitting communication station;

comparing the PAPR value to a predetermined threshold value;

transmitting the transformed-value block without further PAPR calculation at the transmitting communication station when the PAPR value is smaller than the predetermined threshold value; and receiving the transformed-value block and recovering informational content contained within the data block at the receiving station.

20. The method of claim 19 further comprising generating at a control signal provider a control signal that identifies a scrambling sequence of the plurality of scrambling sequences, which identified scrambling sequence is used in generating the transformed-value block that is transmitted.

* * * * *